(12) United States Patent
Wentz

(10) Patent No.: US 6,755,137 B2
(45) Date of Patent: Jun. 29, 2004

(54) ARMREST DESK

(76) Inventor: Richard A. Wentz, 29 Crossvine Way, Simpsonville, SC (US) 29680

( * ) Notice: Subject to any disclaimer, the term of this patent is extended or adjusted under 35 U.S.C. 154(b) by 10 days.

(21) Appl. No.: 10/146,632

(22) Filed: May 14, 2002

(65) Prior Publication Data

US 2003/0214203 A1 Nov. 20, 2003

(51) Int. Cl.[7] .............................................. A47B 23/00
(52) U.S. Cl. ......................................... 108/44; 297/160
(58) Field of Search .......................... 312/140.2, 140.4; 224/275; 108/42, 44, 45, 97, 98; 297/160, 161, 162

(56) References Cited

U.S. PATENT DOCUMENTS

| | | | | |
|---|---|---|---|---|
| 2,958,566 A | * | 11/1960 | Buck ............................ | 108/44 |
| 3,922,973 A | * | 12/1975 | Sturgeon ....................... | 108/26 |
| 3,939,986 A | * | 2/1976 | Pierro .......................... | 211/74 |
| 4,371,138 A | * | 2/1983 | Roberts ....................... | 248/201 |
| 4,524,701 A | * | 6/1985 | Chappell ...................... | 108/44 |
| 4,619,386 A | | 10/1986 | Richardson .................. | 224/277 |
| D318,694 S | * | 7/1991 | Richards-Butts ............ | D21/398 |
| 5,085,153 A | * | 2/1992 | McKee ......................... | 108/44 |
| D329,944 S | | 10/1992 | Longtin ........................ | D3/40 |
| D356,902 S | | 4/1995 | Crowell ....................... | D6/406 |
| 5,409,307 A | | 4/1995 | Forsythe ..................... | 312/194 |
| D365,219 S | | 12/1995 | Tange .......................... | D6/406 |
| D366,164 S | | 1/1996 | McKee ........................ | D6/406 |
| 5,485,793 A | | 1/1996 | Crowell ....................... | 108/44 |
| 5,560,676 A | | 10/1996 | Griffith et al. ........... | 297/188.2 |
| 5,615,620 A | | 4/1997 | Owen .......................... | 108/45 |
| 5,749,305 A | | 5/1998 | Jacovelli ...................... | 108/44 |
| 5,860,897 A | * | 1/1999 | Gilbert et al. ............. | 482/130 |
| 5,950,257 A | | 9/1999 | Smith et al. .................... | 5/2.1 |
| 6,015,198 A | * | 1/2000 | Stair ....................... | 312/235.1 |
| 6,062,145 A | | 5/2000 | Lin .............................. | 108/44 |
| 6,082,270 A | * | 7/2000 | Zerger ......................... | 108/44 |
| 6,098,933 A | | 8/2000 | Stein ........................... | 248/99 |
| 6,109,188 A | | 8/2000 | Russell ........................ | 108/44 |
| 6,135,546 A | * | 10/2000 | Demtchouk ................. | 297/135 |
| 6,520,092 B2 | * | 2/2003 | Marshall et al. ............. | 108/44 |

* cited by examiner

*Primary Examiner*—Ramon O. Ramirez
*Assistant Examiner*—Jon Szumny
(74) *Attorney, Agent, or Firm*—J. Herbert O'Toole; Nexsen Pruet, LLC

(57) ABSTRACT

A computer desk which may be affixed to the armrest of a chair, particularly the armrest of a motor vehicle is secured and placed by adjustable braces to grasp the armrest on either side thereof and is further secured by a strap holding the desk to the armrest to prevent movement.

2 Claims, 5 Drawing Sheets

ARMREST DESK

BACKGROUND OF THE INVENTION

FIELD OF THE INVENTION

This invention relates to a work desk which is attached to and located by the armrest of a chair or seat.

BACKGROUND IN PRIOR ART

The availability of compact electronic devices, particularly laptop and smaller computers and cellular telephones increases the convenience for businessmen to use these devices when calling on clients and provides an impetus for converting a motor vehicle into an office on wheels. Various attempts have been made to provide accommodations for these electronic devices, as well as more mundane accoutrements of an office without destroying utterly the utility of the offside seat.

U.S. Pat. No. 6,109,188 to Russell discloses a tray which covers the seat cushion and portion of the footwell. The tray is at the level of the seat cushion and offset away from the driver's seat. U.S. Pat. No. 6,062,145 to Lin discloses a portable computer work platform which covers the steering wheel of the vehicle. U.S. Pat. No. 5,749,305 to Jacovelli discloses a tray which attaches to the bottom of a steering wheel.

U.S. Pat. No. 5,615,620 to Owen discloses a portable desk which mounts on a base plate secured to the floor of the offside footwell. U.S. Pat. No. 5,560,676 to Griffith et al. discloses a desk carried upon the offside seat of a motor vehicle which has an adjustable height and is secured by the conventional seat belt. The desk may be raised and leveled using adjustable supports and includes a cup holder. U.S. Pat. No. 5,485,793 to Crowell discloses a desk mounted on a rotatable arm which is affixed to a base mounted into the floor of the offside footwell. U.S. Pat. No. 4,619,386 to Richardson discloses a dash-mounted desk which rest in part on the top surface of the dashboard.

Designs for desks for a vehicle include Des. 356,902, Des. 329,944, Des. 366,164 and Des. 365,219.

Prior art discloses desks which share one or more of the following insufficiencies:

they require permanent mounts in the floorboard of a vehicle;

they require a driver to turn away from the road; or they cannot be moved quickly from vehicle to vehicle such as when picking up or returning a rented automobile.

BRIEF SUMMARY OF THE INVENTION

It is an objective of this invention to provide a stable desk for a motor vehicle which is convenient to use, especially when one is delayed by heavy traffic or road blockages. It is further object to this invention to provide a desk for a motor vehicle which may be quickly transferred from vehicle to vehicle. It is a still further object of this invention to provide a desk which may be used on any armchair having an arm with substantially flat sides.

These and other objects of the invention are achieved by providing a substantially flat work surface affixed to and supported by an armrest between the seats of a motor vehicle, being held in place by braces grasping an armrest on opposite sides and secured by a strap cincturing the desk to an armrest.

DETAILED DESCRIPTION OF THE INVENTION

The invention is a lightweight desk surface which is quickly attached to an armrest of a vehicle such as an automobile although it is usable in other locations providing a chair and an armrest. It is to be described in terms of its preferred embodiments which are flat desks for a left hand drive vehicle. For a right hand drive vehicle the locations are simply reversed and, as will become obvious from the description below, desks may be easily converted from a left hand drive to a right hand drive vehicle simply by relocating the armrest braces to the opposite face of the desk.

Figure 1:
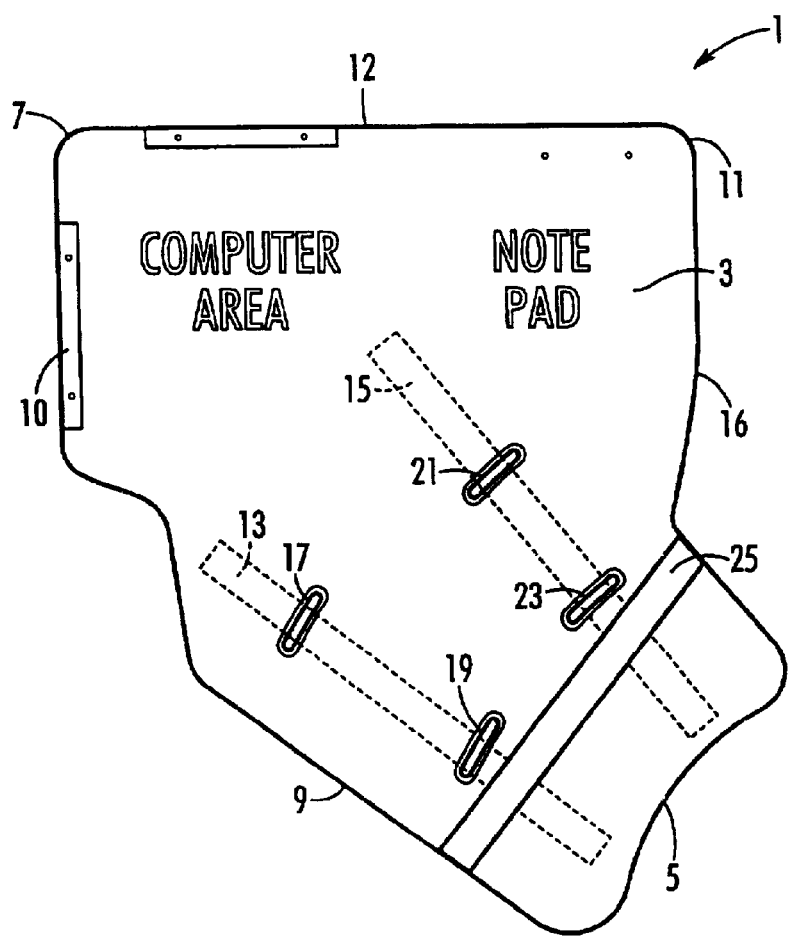
FIG. 1 is a plan view of the desk of this invention.

As shown in FIG. 1, armrest desk 1 consists of a work surface 3 (obverse face) having a proximal end 5 and a distal end 7. As shown, edge 9 is adjacent a driver's leg and corner 11 is directed to the offside door. To accommodate driver controls, a second edge 10 formed at an angle to edge 9 may define the perimeter of the desks between edge 9 and the distal end 7. A third edge 12 connects distal end 7 to offside corner 11 and the figure is completed by at least one fourth side 16. A driver's side armrest brace 13 and an offside armrest brace 15 project beneath the work surface of the desk (reverse face) to bracket the armrest. Adjusting slots 17,19,21 and 23 allow the space between braces 13 and 15 to be adjusted and to compensate for various shapes of armrests. Finally, securing strap 25 wraps the armrest and the proximal portion of the desk to secure same in place during use.

As shown in FIG. 1, areas have been designated as a computer area and a notepad area. These are merely suggestions of potential uses and the desk may be adapted by the user to the types of accoutrements which the user finds necessary and/or convenient. For example, a non-skid surface such as a soft rubber may be adhered to portions where computers, calculators or other electronic devices may be used. Fittings to secure devices in the form of cleats may be attached to the surface or mounted through the desk. Power strips may be attached. The desk may be customized to the user and modified for the user's peculiar requirements.

The work surface of the armrest desk may be made from any material which is readily cut, drilled and finished. Metals such as steel and aluminum may be used. Synthetic plastic sheets are particularly useful and available in many colors and degrees of transparency. A nonlimiting list of suitable plastic includes ABS, acetal polycarbonate, polyester, polyethylene, polyphenylene oxide, polypropylene, polystyrene, and polyurethane. Laminates may be used for decorative or structural purposes. Wood-based materials and foamed-filled construction may also be employed, but are not preferred.

Work surface 3 is clasped on the armrest by braces 13 and 15. Braces 13 and 15 may be made from any suitable material such as those discussed above that are preferably formed from a plastic material such as polyethylene, polypropylene or polyurethane.

The armrest braces 13 and 15 should be at least 15 cm long, preferably at least 20 cm in length and at least 25 mm wide. Their depth should be at least 10 cm, but preferably no more than 15 cm.

A securing strap 25 is preferably made from a synthetic plastic such as nylon or polypropylene and may be secured by any means typically used to secure straps including hook and loop (Velcro™), bayonet fittings, side bar buckles, cam buckle ratchets, clamps or quick-release friction clasps. Preferably, the strap transverses the top of work surface 3 in a shallow channel having a width and depth approximately the same of the strap to be used. Alternatively, the strap may be affixed to one or both sides of the desk with similar lashing mechanisms.

Figure 2:
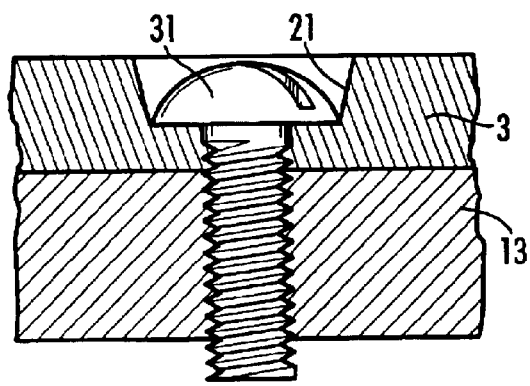
FIG. 2 is a cross-section through the desk and braces showing one method for attachment of the braces.

The armrest braces are adjusted using slots 17,19,21 and 23. A fastener 31 is countersunk into each slot where it passes through the work surface and into a retaining device in and/or below the armrest braces. As illustrated in FIG. 2, the fastener may be a carriage bolt, but any device capable of drawing the brace into interfering relationship with the bottom of the work surface is suitable.

The invention is susceptible to alternative embodiments commensurate with the size and design of the compartment wherein it is used.

Figure 3:
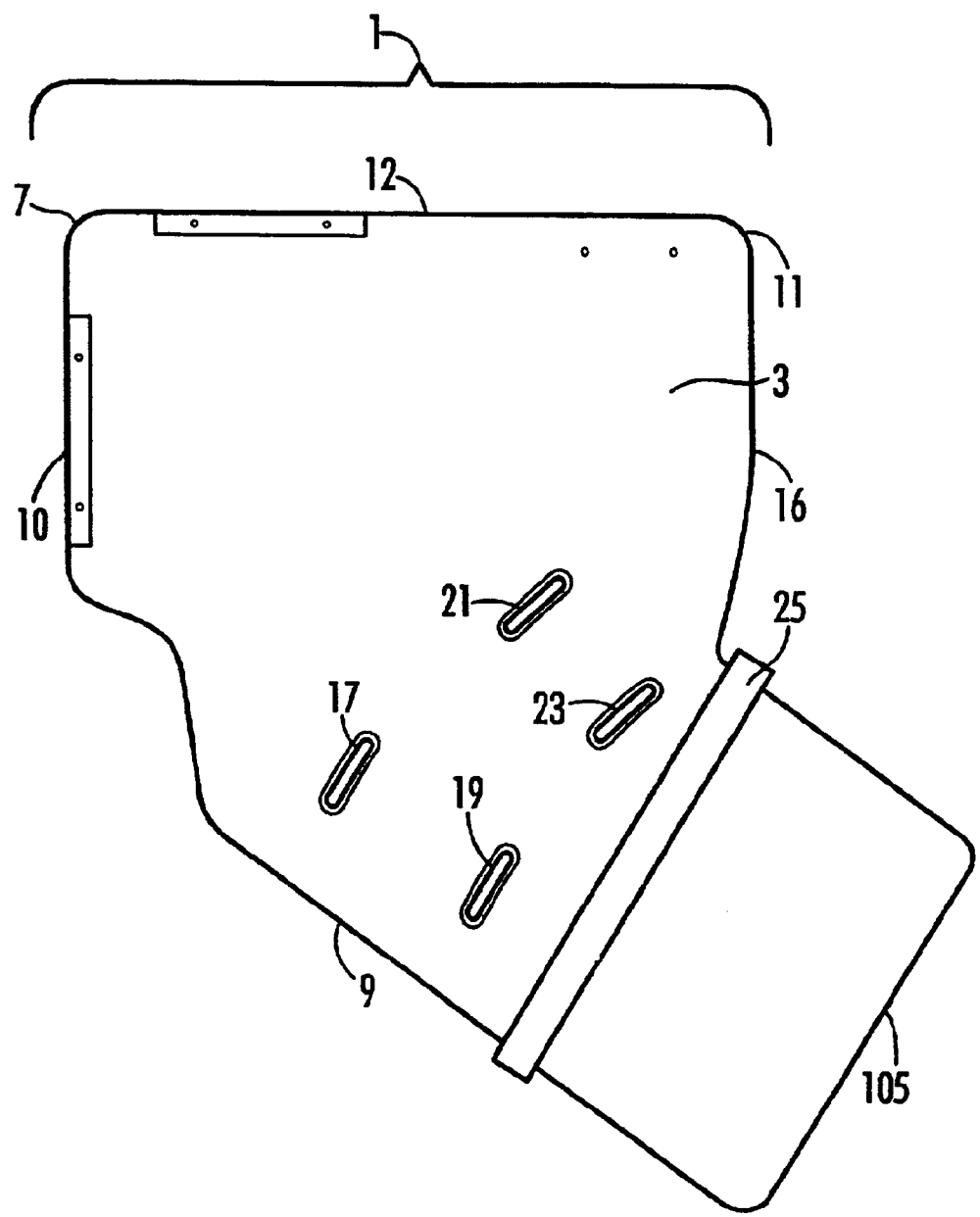
FIG. 3 is a plan view of a second embodiment of this invention.

For example, as is shown in FIG. 3, the proximal end may be changed to be linear, (105) and the workspace enlarged. This embodiment fits large SUV's like the Suburban. When the available space is more restricted and/or when passenger accommodation is desired, the plan area may be elongated as shown in FIG. 4, wherein all 200 series numbers correspond to the elements shown in FIG. 1.

Figure 4:
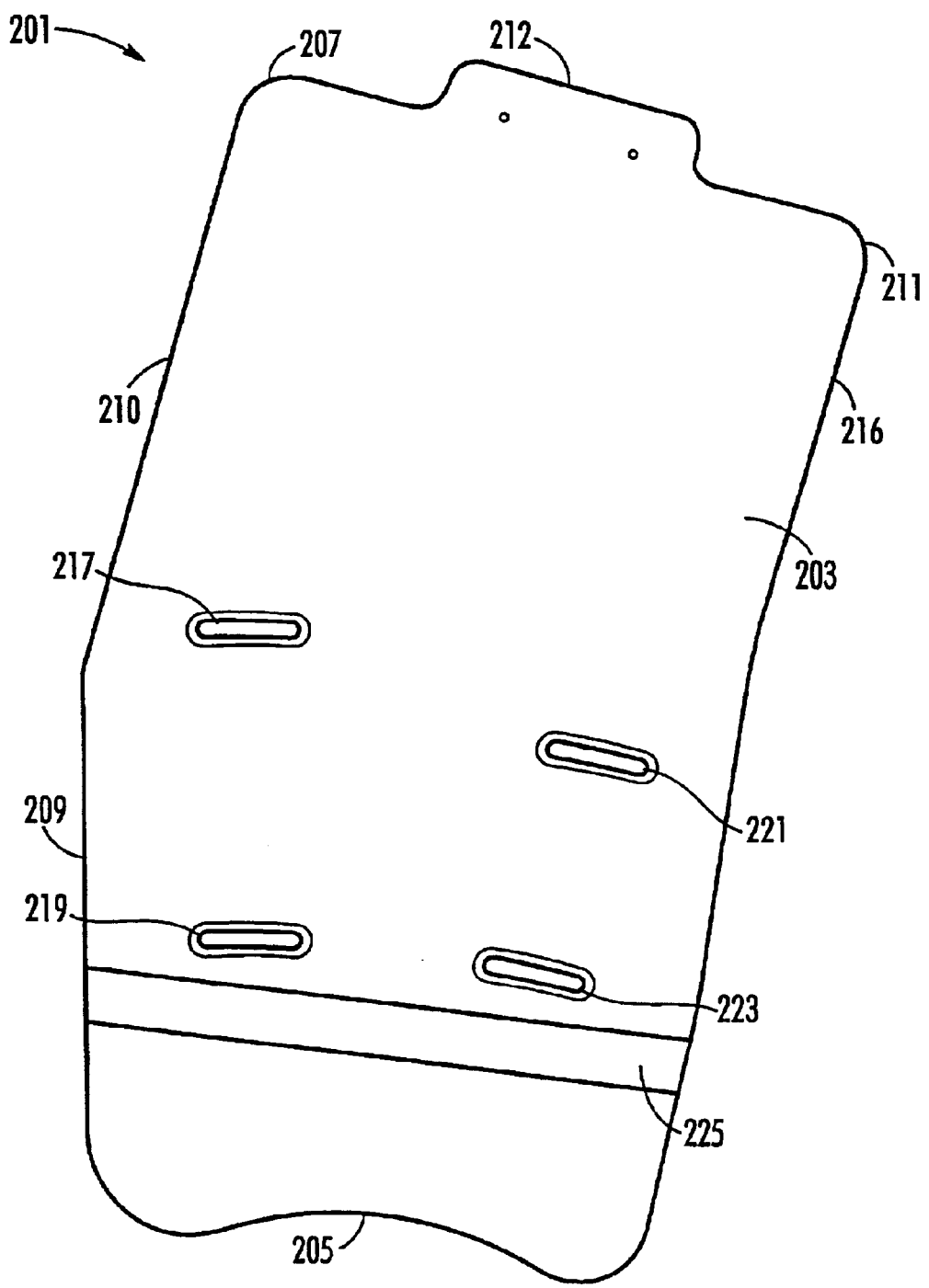
FIG. 4 is a plan view of a third embodiment of this invention.
Figure 5:
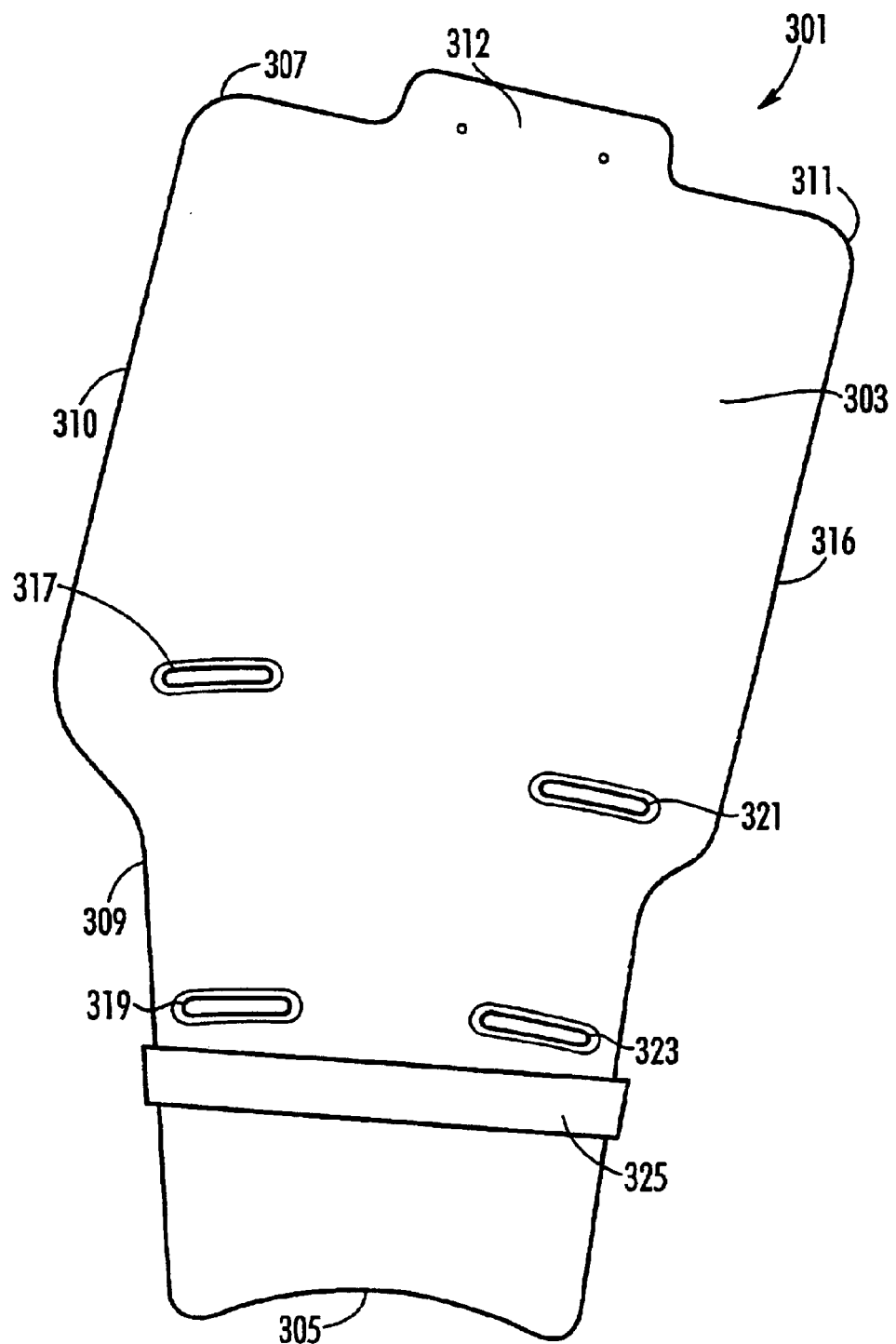
FIG. 5 is a plan view of the fourth embodiment of this invention.
Figure 6:
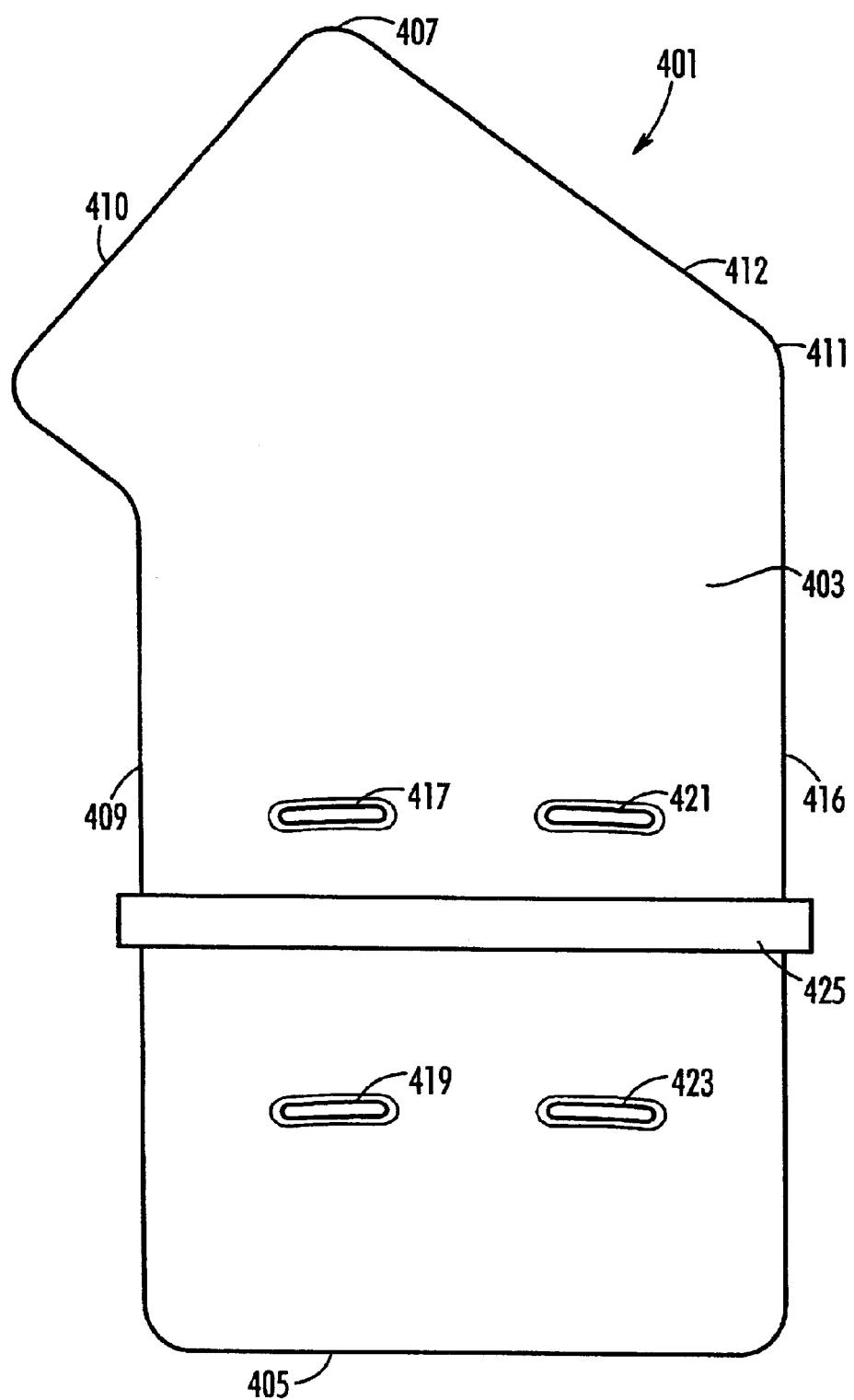
FIG. 6 is a plan view of a fifth embodiment of this invention.

FIG. 5, wherein all 300 series numbers correspond to FIG. 1, is a variant upon FIG. 4 and is suitable for narrower accommodations, especially mid-sized sedans. The plan of FIG. 6, wherein all 400 series numbers correspond to FIG. 1, has been found desirable for use in larger delivery vans and pickup trucks which typically have one armrest.

The invention has been described in terms of its preferred embodiment. Modifications apparent to those with skill in the art are included within the scope of the invention.

I claim:

1. A desk structure for mounting on the armrest of a seat, said desk structure comprising:

a substantially flat rigid sheet of machinable material having obverse and reverse surfaces, an outer perimeter comprising a proximal end (5), a distal corner (7), a first side (9) extending perpendicular to said proximal end, a second side (10) formed at an obtuse interior angle to said first side and extending to said distal corner (7), a third side (12) extending from said distal corner at approximately a right angle to said second side, and at least one additional side (14) between said third side and said proximal end to form an irregular closed figure;

a pair of rigid braces (13, 15) in the form of rails adjustably mounted on the reverse side of said rigid sheet through slotted portions (17, 19, 21, 23) of said sheet;

a securing strap (25) retaining the proximal end (5) of said rigid sheet to an underlying armrest.

2. The desk structure according to claim 1 wherein said securing strap (25) is secured by a means selected from the group consisting of hook and loop fasteners, bayonet fittings, side bar buckles, cam buckle ratchets, clamps or quick-release friction clasps.

* * * * *